(12) United States Patent
Hall et al.

(10) Patent No.: US 6,888,473 B1
(45) Date of Patent: May 3, 2005

(54) REPEATABLE REFERENCE FOR POSITIONING SENSORS AND TRANSDUCERS IN DRILL PIPE

(75) Inventors: David R. Hall, Provo, UT (US); Joe Fox, Spanish Fork, UT (US); David S. Pixton, Lehi, UT (US); H. Tracy Hall, Jr., Provo, UT (US)

(73) Assignee: IntelliServ, Inc., Provo, UT (US)

( * ) Notice: Subject to any disclaimer, the term of this patent is extended or adjusted under 35 U.S.C. 154(b) by 724 days.

(21) Appl. No.: 09/620,073

(22) Filed: Jul. 20, 2000

(51) Int. Cl.$^7$ ................................................ G01V 3/00
(52) U.S. Cl. ........................ 340/854.4; 340/854.5; 340/854.8; 367/82
(58) Field of Search .................... 340/854.4, 854.5, 340/854.8; 367/82, 83; 175/40; 285/333, 355, 390; 439/194

(56) References Cited

U.S. PATENT DOCUMENTS

| | | |
|---|---|---|
| 749,633 A | 1/1904 | Seeley |
| 2,178,931 A | 11/1939 | Crites et al. |
| 2,197,392 A | 4/1940 | Hawthorn |
| 2,249,769 A | 7/1941 | Leonardon |
| 2,301,783 A | 11/1942 | Lee |
| 2,354,887 A | 8/1944 | Silverman et al. |
| 2,379,800 A | 7/1945 | Hare |
| 2,414,719 A | 1/1947 | Cloud |
| 2,531,120 A | 11/1950 | Feaster |
| 2,633,414 A | 3/1953 | Boivinet |
| 2,659,773 A | 11/1953 | Barney |
| 2,662,123 A | 12/1953 | Koenig, Jr. |
| 2,748,358 A | 5/1956 | Johnston |
| 2,974,303 A | 3/1961 | Dixon |
| 2,982,360 A | 5/1961 | Morton et al. |
| 3,079,549 A | 2/1963 | Martin |
| 3,090,031 A | 5/1963 | Lord |
| 3,170,137 A | 2/1965 | Brandt |
| 3,186,222 A | 6/1965 | Martin |
| 3,194,886 A | 7/1965 | Mason |
| 3,209,323 A | 9/1965 | Grossman, Jr. |
| 3,227,973 A | 1/1966 | Gray |
| 3,253,245 A | 5/1966 | Brandt |
| 3,518,608 A | 6/1970 | Papadopoulos |
| 3,696,332 A * | 10/1972 | Dickson et al. .......... 340/855.1 |
| 3,793,632 A | 2/1974 | Still |
| 3,807,502 A | 4/1974 | Heilhecker et al. |
| 3,879,097 A | 4/1975 | Oertle |
| 3,930,220 A * | 12/1975 | Shawhan ...................... 367/82 |
| 3,957,118 A | 5/1976 | Barry et al. |
| 3,989,330 A | 11/1976 | Cullen et al. |
| 4,012,092 A | 3/1977 | Godbey |
| 4,087,781 A | 5/1978 | Grossi et al. |
| 4,095,865 A * | 6/1978 | Denison et al. ............. 439/191 |
| 4,121,193 A | 10/1978 | Denison |
| 4,126,848 A | 11/1978 | Denison |
| 4,215,426 A * | 7/1980 | Klatt ........................... 367/83 |
| 4,220,381 A * | 9/1980 | van der Graaf .......... 340/853.7 |
| 4,348,672 A | 9/1982 | Givler |
| 4,445,734 A * | 5/1984 | Cunningham ............... 439/194 |

(Continued)

*Primary Examiner*—Albert Wong
(74) *Attorney, Agent, or Firm*—Jeffery E. Daly

(57) ABSTRACT

A drill pipe having a box end having a tapered thread, and an internal shoulder and an external face for engagement with a drill pipe pin end having a tapered mating thread, and an external shoulder and an external face adapted for data acquisition or transmission. The relative dimensions of the box and pin ends are precisely controlled so that when the tool joint is made up, a repeatable reference plane is established for transmitting power and tuning downhole sensors, transducers, and means for sending and receiving data along the drill string. When the power or data acquisition and transmission means are located in the tool joint, the dimensions of the tool joint are further proportioned to compensate for the loss of cross-sectional area in order maintain the joints ability to sustain nominal makeup torque.

26 Claims, 3 Drawing Sheets

U.S. PATENT DOCUMENTS

| | | |
|---|---|---|
| 4,496,203 A | 1/1985 | Meadows |
| 4,537,457 A | 8/1985 | Davis, Jr. et al. |
| 4,548,431 A * | 10/1985 | Hall et al. ............... 285/334 |
| 4,578,675 A | 3/1986 | Macleod |
| 4,605,268 A | 8/1986 | Meador |
| 4,660,910 A | 4/1987 | Sharp et al. |
| 4,683,944 A | 8/1987 | Curlett |
| 4,698,631 A | 10/1987 | Kelly, Jr. et al. |
| 4,722,402 A | 2/1988 | Weldon |
| 4,785,247 A | 11/1988 | Meador et al. |
| 4,788,544 A | 11/1988 | Howard |
| 4,806,928 A | 2/1989 | Veneruso |
| 4,807,781 A * | 2/1989 | Bobinger et al. ........... 222/546 |
| 4,884,071 A * | 11/1989 | Howard .................. 340/854.8 |
| 4,901,069 A | 2/1990 | Veneruso |
| 4,914,433 A | 4/1990 | Galle |
| 4,924,949 A | 5/1990 | Curlett |
| 5,008,664 A | 4/1991 | More et al. |
| 5,052,941 A | 10/1991 | Hernandez-Marti et al. |
| 5,148,408 A | 9/1992 | Matthews |
| 5,248,857 A | 9/1993 | Ollivier |
| 5,278,550 A | 1/1994 | Rhein-Knudsen et al. |
| 5,302,138 A | 4/1994 | Shields |
| 5,311,661 A | 5/1994 | Zifferer |
| 5,332,049 A | 7/1994 | Tew |
| 5,334,801 A | 8/1994 | Mohn |
| 5,371,496 A | 12/1994 | Tanamachi |
| 5,454,605 A | 10/1995 | Mott |
| 5,455,573 A | 10/1995 | Delatorre |
| 5,505,502 A | 4/1996 | Smith et al. |
| 5,517,843 A | 5/1996 | Winship |
| 5,521,592 A | 5/1996 | Veneruso |
| 5,568,448 A * | 10/1996 | Tanigushi et al. ............. 367/82 |
| 5,650,983 A | 7/1997 | Kondo et al. |
| 5,691,712 A | 11/1997 | Meek et al. |
| 5,743,301 A | 4/1998 | Winship |
| RE35,790 E | 5/1998 | Pustanyk et al. |
| 5,810,401 A | 9/1998 | Mosing et al. |
| 5,833,490 A | 11/1998 | Bouldin |
| 5,853,199 A | 12/1998 | Wilson |
| 5,856,710 A | 1/1999 | Baughman et al. |
| 5,898,408 A | 4/1999 | Du |
| 5,908,212 A * | 6/1999 | Smith et al. ................ 285/333 |
| 5,924,499 A | 7/1999 | Birchak et al. |
| 5,942,990 A | 8/1999 | Smith et al. |
| 5,955,966 A | 9/1999 | Jeffryes et al. |
| 5,959,547 A | 9/1999 | Tubel et al. |
| 5,971,072 A | 10/1999 | Huber et al. |
| 6,030,004 A | 2/2000 | Schock et al. |
| 6,041,872 A * | 3/2000 | Holcomb .................... 175/40 |
| 6,045,165 A | 4/2000 | Sugino et al. |
| 6,046,685 A | 4/2000 | Tubel |
| 6,057,784 A | 5/2000 | Schaaf et al. |
| 6,104,707 A | 8/2000 | Abraham |
| 6,108,268 A | 8/2000 | Moss |
| 6,123,561 A | 9/2000 | Turner et al. |
| 6,141,763 A | 10/2000 | Smith et al. |
| 6,173,334 B1 | 1/2001 | Matsuzaki et al. |
| 6,177,882 B1 | 1/2001 | Ringgenberg et al. |
| 6,188,223 B1 | 2/2001 | van Steenwyk et al. |
| 6,196,335 B1 | 3/2001 | Rodney |
| 6,209,632 B1 | 4/2001 | Holbert et al. |
| 6,223,826 B1 | 5/2001 | Chau et al. |
| 6,367,565 B1 | 4/2002 | Hall |
| 6,392,317 B1 | 5/2002 | Hall et al. |
| 6,405,795 B2 | 6/2002 | Holbert et al. |
| 6,641,434 B2 | 11/2003 | Boyle et al. |
| 6,655,464 B2 | 12/2003 | Chau et al. |
| 6,670,880 B1 | 12/2003 | Hall et al. |
| 2002/0135179 A1 | 9/2002 | Boyle et al. |
| 2002/0193004 A1 | 12/2002 | Boyle et al. |
| 2003/0070842 A1 | 4/2003 | Bailey et al. |
| 2003/0213598 A1 | 11/2003 | Hughes |

* cited by examiner

REPEATABLE REFERENCE FOR POSITIONING SENSORS AND TRANSDUCERS IN DRILL PIPE

This invention was made with government support under Contract No. DE-FC26-97FT343656 awarded by the U.S. Department of Energy. The government has certain rights in the invention.

RELATED APPLICATIONS

None

BACKGROUND OF THE INVENTION

This invention relates to adapting drill pipe for use in the oil, gas, and geothermal drilling industries for power and data transmission. More particularly, this invention relates to providing a repeatable reference for positioning and tuning connectors, transducers, and sensors along the drill string and within the drill pipe joint.

The need for acquisition and bidirectional transmission of power and data along the drill string has been recognized for more than half a century, and as exploration and drilling technology have improved, this need has become more and more an imperative in the industry for successful oil, gas, and geothermal well production. However, despite a plethora of literature in this area, the only system to gain commercial acceptance uses pressure impulses transmitted through the drilling fluid as a means for data communication. The chief drawbacks to this system are that the data rate is very slow, less than 10 baud; the system is very complex and expensive; the results are inconsistent; and range of performance is limited. It appears that the other proposed systems have not gained commercial acceptance due to the unique characteristics of the drill pipe tool joint. The following patents exhibit some of the relevant systems proposed to accomplish this most critical task.

U.S. Pat. No. 3,696,332, incorporated herein by this reference, teaches the use of an electrical conductor extended along the interior of each pipe and connected to an annular groove within the pipe joint.

U.S. Pat. No. 3,930,220, incorporated herein by this reference, teaches an acoustic system using repeaters along the drill string to prevent the loss of the signal being transmitted.

U.S. Pat. No. 4,548,431, incorporated herein by this reference, teaches a double shouldered tool joint. The tool joint has both internal and external makeup shoulders. The pin and box are dimensioned so that box face contacts the external shoulder while there is still a clearance the pin face and the internal shoulder. This joint is strengthened against the additional torque that may be encountered downhole when the bit or drill pipe gets stuck.

U.S. Pat. No. 4,807,781, incorporated herein by this reference, is another patent that teaches a telemetry system. Sensors are disclosed that measure such parameters as pressure, temperature, salinity, direction of well bore, bit conditions, as well as the standard well logging parameters. The sensor outputs are converted to a digital form and stored until called for from the surface. Transmission is accomplished by low frequency modulation of a carrier wave in the 1–30 hertz range. The system, including periodic repeaters, is positioned within the bore of the drill pipe without substantially decreasing the clearance for mud flow.

U.S. Pat. No. 4,095,865, incorporated herein by this reference, teaches the use of a conduit deployed within the drill pipe as a conveyance for the insulated conductor and means for attaching the conduit to the pipe wall.

U.S. Pat. No. 4,215,426 teaches a system in which wiring extends through the drill pipe employing magnetic coupling between the pipe sections. The use of signal enforcers is also taught. Power transmission is achieve by means of an acoustic power generator and a means for converting the acoustic wave to a DC voltage.

U.S. Pat. No. 4,220,381, incorporated herein by this reference, teaches the use of a conductor wire in each pipe section connected to electrodes that are exposed to the drilling fluid in each joint. A high voltage is used to hop the current across the joint and thereby provide and link between each pipe section.

U.S. Pat. No. 4,445,734, incorporated herein by this reference, teaches the use of a wire secured within the pipe by a liner. The wire is connected to annular contacts at each joint. The contact mechanism includes a means for wiping the surfaces of the contacts and of exerting pressure on the contacts in order to ensure efficient signal transmission.

U.S. Pat. No. 4,884,071, incorporated herein by this reference, teaches the use of a Hall Effect coupler. A self-contained power supply is located at each joint and coupled to the Hall Effect device sending and receiving units. A conductor wire, shielded by a conduit, extends along the pipe bore and connects couplers at each end of the pipe.

U.S. Pat. No. 5,568,448, incorporated herein by this reference, teaches the use of an ultrasonic wave that is propagated through a propagation medium. An acoustic waver receiver converts the wave to an electric signal.

U.S. Pat. No. 6,041,872, incorporated herein by this reference, teaches the use of a disposable cable deployed along the bore of the drill string. It is deployed from a spool at the bottom of the drill string and fed out as the drill pipes are added. When pipes sections are removed, the cable is cut off and disposed of. A data transmission device is connected to the cable. The cable may be suitable for electromagnetic or fiber optic communications.

U.S. Pat. No. 5,908,212, incorporated herein by this reference, teaches a double shouldered tool joint capable of sustaining high torque. The disclosure identifies a relationship between the cross-sectional areas of the nose section of the pin end and the counter bore section of the box end. The sum of these two areas are correlated with cross-sectional area of the joint wall adjacent the internal shoulder of the box end.

U.S. Pat. No. 6,057,784, also incorporated herein, discloses another combination electromagnetic mud impulse system. Data from sensors at the bit is transmitted by means of an electromagnetic wave to a receiver that converts the wave into a pressure pulse in the drilling fluid for transmission up hole.

What is needed then is a tool joint that provides a repeatable reference for precise positioning and tuning of connectors, sensors, and transducers disposed within the tool joint and at locations along the drill string.

SUMMARY OF THE INVENTION

This disclosure presents a drill pipe and tool joint adapted for power and data acquisition and transmission that will enable communication along the drill string. In order to achieve communication along the drill string, the connectors, sensors, and transducers, and means for power and data transmission must be precisely positioned along the drill pipe and within the tool joint. This disclosure provides a tool joint having a precise, repeatable plane of reference that can be used for positioning communication devices within the joint and along the drill string.

This disclosure enables precise positioning of connectors and tuning of downhole sensors and transducers by deploying them in reference to a predictable plane established within the tool joint by the axial alignment of the internal shoulder of the box end and the external face of the pin end. This alignment is achieved by precisely coordinating the dimensions of the pin end joint with the dimensions of the box end joint so that a predictable plane of reference is established. The reference plane is within the box end joint and results from the differences in the lengths between the internal shoulder and external face of the box, and between the external shoulder and the external face of the pin end; the box length being greater than the pin length. As the mating joints are engaged and makeup torque is achieved, the differences in length result in a predictable plane of contact or a gap between the pin face and the internal shoulder of the box end. This predictable plane of contact or gap, then, establishes a repeatable plane of reference. In tool joints employing shoulders as a means for producing makeup torque, sensors and transducers may be installed at locations along the pipe or within the joint in precise reference to the external shoulder and external face of the pin end, or in reference to the internal shoulder and external shoulder of the box end. In tool joints where the threads are used to achieve makeup torque without loading the shoulders, the mating threads may be timed in order to produce a repeatable reference contact or non-contact plane. In this manner, when the tool joints are made up and makeup torque is achieved, the sensors and transducers will be located at predictable and repeatable distances apart to enable precise positioning and tuning.

An additional benefit of this invention is that sensors located in reference to the repeatable plane of reference may be used to reliably indicate makeup torque and additional torsional loads placed upon of the drill pipe and the drill string during drilling. Such information is valuable in order to ensure proper drill string makeup and to prevent overtorque conditions and twist offs during drilling.

DETAILED DESCRIPTION OF THE INVENTION

Figure 1:
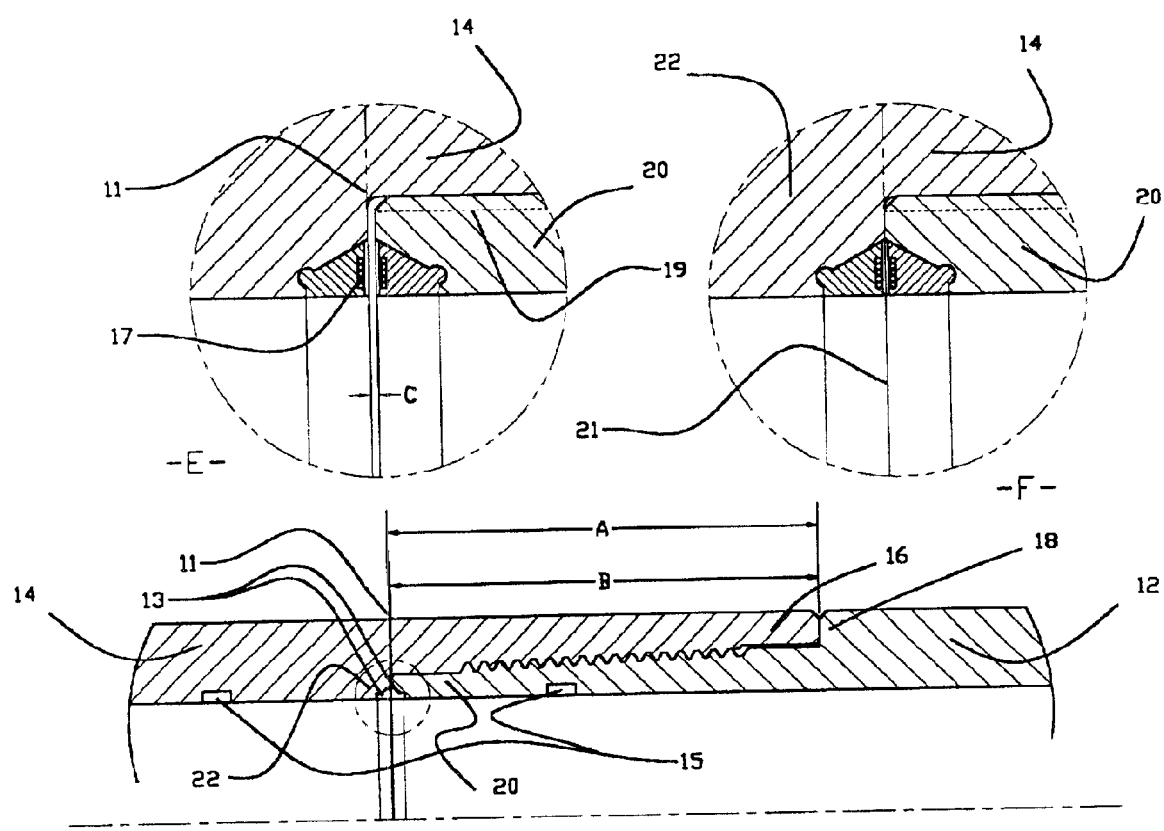
FIG. 1 is a representation of a tool joint depicting the repeatable reference.

The need for power transmission and high-speed data acquisition and transmission of well drilling parameters has long been recognized. However, to date, the only system that has gained commercial acceptance is the mud pulse system. The chief drawbacks of the mud pulse system are its slow data rates, the limited range of data that may be transmitted, its complexity, and its inconsistent results. What is need is a drill pipe and tool joint that are adapted for high- speed data communication all along the drill string. This invention relates to adapting drill pipe for use in the oil, gas, and geothermal drilling industries for data acquisition and transmission. This patent discloses a drill pipe and tool joint having a repeatable, predictable reference for positioning and tuning transducers and sensors positioned along the drill string.

This disclosure enables precise positioning and tuning of downhole sensors and transducers by deploying them in reference to a predictable plane established within the tool joint by the axial alignment of the internal shoulder of the box end and the external face of the pin end. This alignment is achieved by coordinating the dimensions of the pin end joint with the dimensions of the box end joint so that a predictable plane of reference is established. The reference plane is within the box end joint and results from the differences in the lengths between the internal shoulder and external face of the box, and between the external shoulder and the external face of the pin end; the box length being greater than the pin length. As the mating joints are engaged and makeup torque is achieved, the differences in length result in predictable gap between the pin face and the internal shoulder of the box end. This predictable gap, then, establishes a reliable plane of reference. Connectors, sensors and transducers may be installed at locations along the pipe or within the joint in precise reference to either, the external shoulder and external face of the pin end, or in reference to the internal shoulder and external shoulder of the box end. In this manner, when the pipe is made up and makeup torque is achieved, the connectors, sensors, and transducers will be located at predictable distances apart to enable precise tuning.

In the past, many proposals have been made to position within the box and pin ends a means for electrically, electromagnetically, or acoustically bridging the joint in order to achieve communication along the drill string. None of these systems have gained commercial acceptance due, at least in part, to the fact they have not taken into consideration the effect such a system will have on the strength of the made up tool joint. The strength of the tool joint is relative to yield strength of the material from which the joint is manufactured. The torsional strength of the tool joint is dependent on the cross-sectional areas of the counter bored section of the box end, and the nose section of the pin end. Therefore, another object of this invention is to provide a tool joint that is adapted to receive a means for data acquisition and transmission without compromising its torsional strength.

The characteristics of the present invention will be further understood in reference to the following drawing figures.

FIG. 1 is a representation of a made-up tool joint depicting elements of the present invention in partial cross section. In joint makeup, box end 14 receives pin end 12 by means of mating threads. The respective ends are rotated together until the face of nose 16 contacts shoulder 18. A makeup torque is then applied to the members of approximately one-half of the torsional strength of the joint members. In double-shoulder applications, the face of internal nose 20 may contact internal shoulder 22 at or before makeup torque is achieved. By precisely controlling the length of dimension A of the box end and the length of dimension B of the pin end, a predictable plane of reference 11 may be achieved at junction 21 of shoulder 22 and the face of nose 20. In applications where dimensions A and B result in repeatable gap C, the distance across gap C becomes the plane of reference. The distance across gap C should be no greater than 1.0 inches, but preferably less than 0.100 inches. In this manner, sensors or transducers 15 may be positioned along the drill pipe at predetermined locations and tuned to one another by their reference to the repeatable reference 11 or gap C. For example, a planar inductive coil 17 may be disposed within groove 13 and brought into close proximity during joint makeup. The repeatable, relative positions of the mating coils enable power conservation and predictable coupling of the electromagnetic fields. Furthermore, since the sensors 15 are tuned according to their distance apart from the repeatable reference 11, a change in distance due to compression or strain on the joint, which may indicate over-torque conditions in the pipe, may be immediately known.

Figure 2:
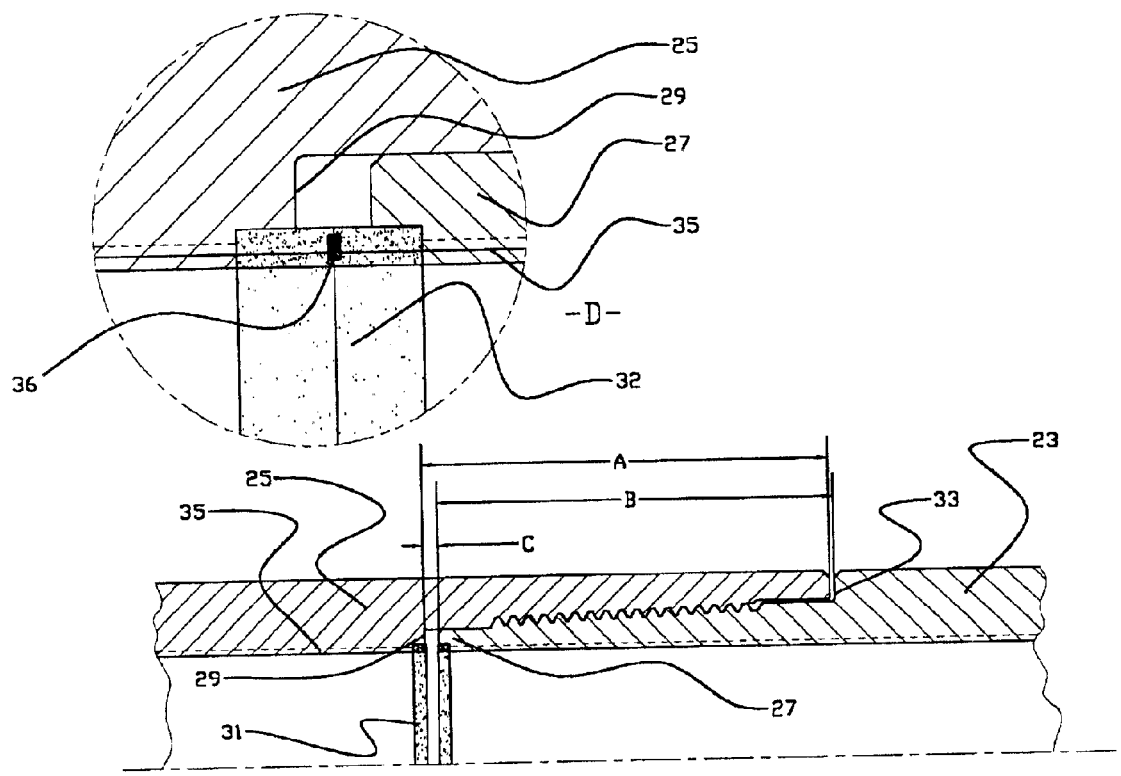
FIG. 2 is a representation of the present invention in a tool joint having interlocking threads that carry the loads of joint makeup.

FIG. 2 is a representation of another aspect of the present invention in which the repeatable reference is achieved in a tool joint that uses interlocking threads capable of bearing stresses that resist torsional makeup. In this application, the tool joint relies on the fit of the mating threads to produce makeup torque and to seal the joint against fluid loss. The repeatable plane of reference is achieved in this joint by precisely controlling dimensions A and B, which, in turn, produces a repeatable gap C between the face of internal nose portion 27 and internal shoulder 29, as pin end 23 is screwed into box end 25. Grooves 31 may be installed along the plane of reference for housing connectors, sensors, or transducers. Repeatable gap C should be less than 1.0 inches and preferably less than 0.100 inches. It may be desirable that grooves 32 are disposed adjacent one another at joint makeup, producing a situation wherein the power and data transmitting components 36 are in close proximity or in contact with one another. The applicants believe that the repeatable plane of reference is essential for power and data transmission across the tool joint, as well as for optimizing the use of connectors, transducers, or sensors in the tool joint and along the drill pipe.

Figure 3:
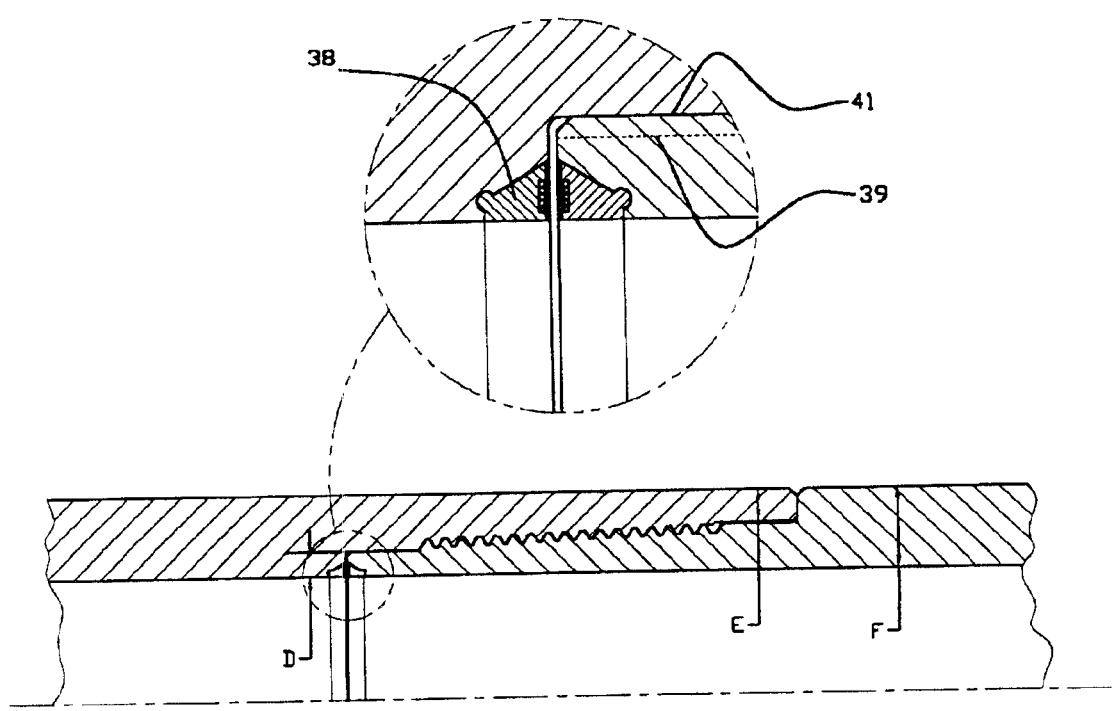
FIG. 3 is a representation of tool joint wherein only one shoulder is loaded when the joint is made-up.

FIG. 3 is another representation of a portion of a drill pipe joint. The principles discussed herein are applicable whether the shoulder or interlocking threads are used to achieve tool joint makeup torque. Makeup torque of the tool joint is determined in reference to the torsional strength of the drill pipe tubular and the torsional strength of the tool joint, itself. It is usually between approximately one half to three quarters the torsional strength of the drill pipe. The torsional strength of the drill pipe and the tool joint is dependent on a number of factors, including the alloy composition of the material, its metallurgical properties, and the cross sectional area of the pipe and the joint F. Therefore, the weakest portion of the joint is where the cross sectional area is the least, which are the nose portion of the pin end D and the counter bore portion of the box end E. In applications where connectors, transducers, or sensors are disposed within a radial or axial groove within the wall of the pipe or joint, and the area of the groove 38 compromises the torsional strength of the drill pipe or joint, the cross sectional area of the pipe wall F may be increased from diameter 39 to diameter 41 in order to maintain the integrity of the pipe or joint.

Those skilled in the art will immediately recognize applications and variations of the invention claimed herein, and such are included within the scope of this disclosure.

What is claimed:

1. A drill string comprising a plurality of downhole components, each downhole component having two ends, the plurality of downhole components each detachably joined one to another at their respective ends;
   each downhole component having at least two coupled inductive transmission devices, with at least one transmission device mounted in a reference plane in each end of the downhole component such that the transmission device is paired with and spaced a distance from the adjacent transmission device in the adjacent reference plane in the adjacent joined downhole component, wherein the distance between each set of paired transmission devices is substantially constant, forming a tuned electrical communication system in the plurality of downhole components.

2. The drill string of claim 1, wherein the downhole components comprise lengths of drill pipe to form a drill string for oil, gas, and geothermal well drilling.

3. The drill string of claim 1, wherein the downhole components are detachably joined one to another with tool joints wherein, when each tool joint is connected under a nominal makeup torque, the distance between an internal shoulder of a box end and an external face of a pin end of the tool joint is between 0.003 and 0.010 inches.

4. The drill string of claim 3, wherein the downhole components comprise lengths of drill pipe to form a drill string for oil gas, and geothermal well drilling.

5. The drill sting of claim 2 wherein the electrical communication system comprises a combination of power transmission and data transmission.

6. The drill string of claim 3, wherein when the tool joint is made up under a nominal makeup torque, the predetermined distance between the paired transmission devices is less than 0.010 inches.

7. The drill string of claim 3, wherein the makeup torque is at least approximately 0.5 times the torsional yield strength of the tool joint.

8. The drill string of claim 3, wherein the tool joint is capable of sustaining an additional torque of approximately 1.25 times the makeup torque.

9. The drill string of claim 3, wherein, when the transmission devices are located within the box end of the drill pipe, a cross-sectional area of a counterbore, the internal shoulder, and tapered thread are further proportioned to sustain a nominal makeup torque.

10. The drill string of claim 3, wherein, when the transmission devices are located within a nose section of a pin end of the drill pipe, the nose section, a tapered thread, a base section, and an external shoulder are further proportioned to sustain a nominal makeup torque.

11. The drill string of claim 9, wherein said joint is capable of sustaining an additional torque of approximately 1.25 times the nominal makeup torque.

12. The drill string of claim 10, wherein said joint is capable of sustaining an additional torque of approximately 1.25 times the nominal makeup torque.

13. The drill string of claim 3, wherein, when an additional torque of approximately 1.25 times the nominal torque is applied to the joint, the predetermined distance between the paired transmission devices is less than 0.010 inches.

14. The drill string of claim 1, wherein a device communicating with the tuned electrical communication system is selected from the group consisting of conductors, accelerometers, potentiometers, gamma ray sensors, thermocouples, pressure transducers, inclinometers, magnetometers, chemical sensors, and acoustic transducers.

15. A drill string comprising a plurality of downhole components, each downhole component having two ends, the plurality of downhole components each detachably joined one to another at their respective ends;
   each downhole component having at least two coupled inductive transmission devices, with at least one transmission device mounted in a reference plane in each end of the downhole component such that the transmission device is paired with and spaced a distance from the adjacent transmission device in the adjacent reference plane in the adjacent joined downhole component, wherein the distance between each set of paired transmission devices is substantially constant, forming a tuned electrical communication system in the plurality of downhole components; wherein the downhole components comprise lengths of drill pipe to from a drill string for oil, gas, and geothermal well drilling which are detachably joined one to another with tool joints wherein, when each tool joint is connected under a nominal makeup torque, the distance between an internal shoulder of a box end and an external face of a pin end of the tool joint is between 0.003 and 0.010 inches.

16. The drill string of claim 15, wherein the downhole components comprise lengths of drill pipe to form a drill string for oil, gas, and geothermal well drilling.

17. The drill string of claim 15, wherein the electrical communication system comprises a combination of power transmission and data transmission.

18. The drill string of claim 15, wherein, when the tool joint is made up under a nominal makeup torque, the predetermined distance between the paired transmission devices is less than 0.010 inches.

19. The drill string of claim 15, wherein the makeup torque is at least approximately 0.5 times the torsional yield strength of the tool joint.

20. The drill string of claim 15, wherein the tool joint is capable of sustaining an additional torque of approximately 1.25 times the makeup torque.

21. The drill string of claim 15, wherein, when the transmission devices are located within the box end of the drill pipe, a cross-sectional area of a counterbore, the internal shoulder, and a tapered thread are further portioned to sustain a nominal makeup torque.

22. The drill string of claim 15, wherein, when the transmission devices are located within a nose section of a pin end of the drill pipe, the nose section, a tapered thread, a base section, and an external shoulder are further proportioned to sustain a nominal makeup torque.

23. The drill string of claim 21, wherein said joint is capable of sustaining an additional torque of approximately 1.25 times the nominal makeup torque.

24. The drill string of claim 22, wherein said joint is capable of sustaining an additional torque of approximately 1.25 times the nominal makeup torque.

25. The drill string of claim 15, wherein, when an additional torque of approximately 1.25 times the nominal torque is applied to the joint, the predetermined distance between the paired transmission devices is less than 0.010 inches.

26. The drill string of claim 15 herein a device communicating with the tuned electrical communication system is selected from the group consisting of conductors, accelerometers, potentiometer gamma ray sensors, thermocouples, pressure transducers, inclinometer, magnetometers, chemical sensors, and acoustic transducers.

* * * * *